Figure 1:
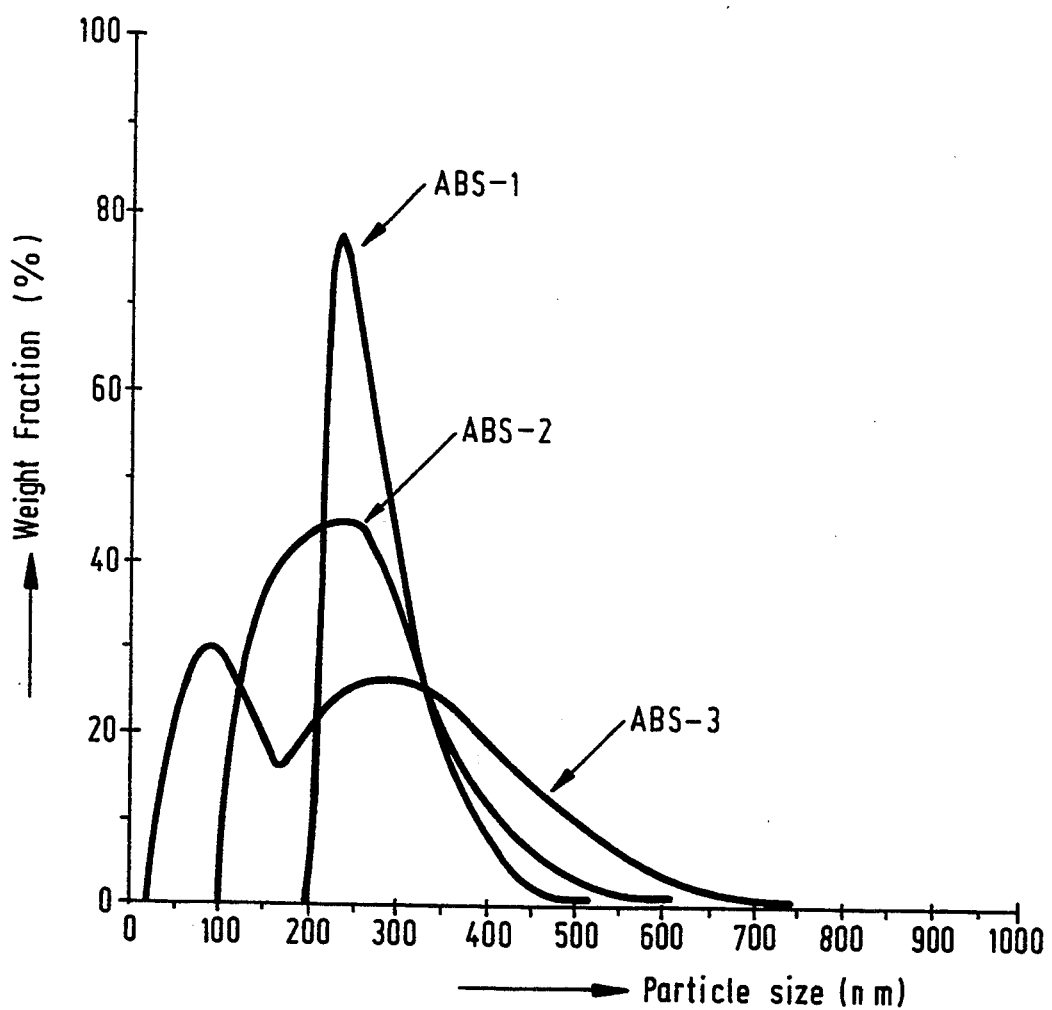

United States Patent [19]

Roovers et al.

[11] Patent Number: 5,367,021
[45] Date of Patent: Nov. 22, 1994

[54] POLYMER MIXTURE COMPOSED OF AN AROMATIC POLYCARBONATE, OPTIONALLY A POLYALKYLENETEREPHTHALATE AND A GRAFT COPOLYMER

[75] Inventors: Wilhelmus M. M. Roovers, Steenbergen; Wilhelmus J. D. Steendam, Bergen op Zoom, both of Netherlands

[73] Assignee: General Electric Company, Pittsfield, Mass.

[21] Appl. No.: 180,165

[22] Filed: Jan. 11, 1994

[30] Foreign Application Priority Data

Jan. 14, 1993 [NL] Netherlands .............. 9300069
Nov. 20, 1993 [EP] European Pat. Off. ....... 93118688.6

[51] Int. Cl.$^5$ ............................................. C08L 69/00
[52] U.S. Cl. ........................................ 525/67; 525/316; 525/64
[58] Field of Search ................................................ 525/67

[56] References Cited

U.S. PATENT DOCUMENTS

| | | | |
|---|---|---|---|
| 4,472,554 | 9/1984 | Grigo et al. | 525/67 |
| 4,748,203 | 5/1988 | van Abeelen | 525/67 |
| 4,764,555 | 8/1988 | Shigemitsu | 525/67 |

FOREIGN PATENT DOCUMENTS

| | | |
|---|---|---|
| 0064648 | 11/1982 | European Pat. Off. . |
| 0326979 | 8/1989 | European Pat. Off. . |
| 0360074 | 3/1990 | European Pat. Off. . |
| 0396958 | 11/1990 | European Pat. Off. . |
| 2901576 | 7/1980 | Germany . |
| 9002254 | 5/1992 | Netherlands . |

OTHER PUBLICATIONS

Abstract of J5017508.
Derwent Abstract of NL-9002254.
Derwent Abstract of DE 2901576.

*Primary Examiner*—David Buttner

[57] ABSTRACT

The invention relates to a polymer mixture comprising
A) 55-90% by weight of an aromatic polycarbonate (A1) or a mixture of an aromatic polycarbonate (A1) and a polyalkylene terephthalate (A2);
B) 10-30% by weight of a graft copolymer built up from a diene rubber graft base on which at least one of the following vinyl monomers has been grafted: styrene, acrylonitrile, methyl methacrylate;
C) 0-15% by weight of a copolymer of styrene, alphamethyl styrene, methyl methacrylate or mixtures thereof and acrylonitrile, methacrylonitrile, methyl methacrylate or mixtures thereof, the percentages by weight being calculated with respect to the sum of the constituents A, B and C, the diene rubber graft base having a monodisperse particle size distribution having such a narrow particle size distribution that the diameter of more than 50% by weight of the particles lies between 200 and 300 nanometers and the diameter of more than 70% by weight of the particles lies between 200 and 400 nanometers.

The use of a graft copolymer having a certain particle size distribution results in a polymer mixture having improved properties.

10 Claims, 1 Drawing Sheet

POLYMER MIXTURE COMPOSED OF AN AROMATIC POLYCARBONATE, OPTIONALLY A POLYALKYLENETEREPHTHALATE AND A GRAFT COPOLYMER

The invention relates to a polymer mixture comprising:
A) 55-90% by weight of an aromatic polycarbonate (A1) or a mixture of an aromatic polycarbonate (A1) and a polyalkylene terephthalate (A2);
B) 10-30% by weight of a graft copolymer built up from a diene rubber graft base on which at least one of the following vinyl monomers has been grafted: styrene, acrylonitrile, methyl methacrylate;
C) 0-15% by weight of a copolymer of styrene, alphamethyl styrene, methyl methacrylate or mixtures thereof and acrylonitrile, methacrylonitrile, methyl methacry late or mixtures thereof, the weight percentages being calculated with respect to the sum of the constituents A, B and C.

Polymer mixtures which comprise an aromatic polycarbonate and a graft copolymer are generally known. U.S. Pat. No. 4,472,554 discloses polymer mixtures which comprise an aromatic polycarbonate, a graft copolymer, and a polymeric "acidifying" agent. The graft copolymer consists of a diene rubber on which monomers have been grafted; the diene rubber has an average particle size from 50 to 1,200 nanometers. In the examples nothing is stated regarding the particle size of the rubbers used. The acidifying polymer is added to improve the thermal stability of the polymer mixture.

DE-A-22 59 565 discloses polymer mixtures which comprise an aromatic polycarbonate, a graft copolymer and a copolymer. The graft copolymer has been obtained by grafting one or more monomers on a rubber with an average particle size of preferably 50-150 nanometers. This patent publication provides no indication whatsoever regarding the distribution of the particle size; it is stated that the selected average particle size leads to polymer mixtures from which articles having an improved weld line strength can be obtained.

U.S. Pat. No. 4,622,363 discloses polymer mixtures which comprise an aromatic polycarbonate, a graft copolymer and two different copolymers. The molecular weights of the copolymers differ: the former has a molecular weight of 15,000 to 200,000, the latter has a molecular weight of 2,000,000 to 10,000,000. The presence of a small quantity of the second copolymer results in an improvement of the resistance to deformation at elevated temperatures.

Polymer mixtures which comprise polyalkylene terephthalates and graft copolymers are also known. For example, U.S. Pat. No. 0 056 243 discloses polymer mixtures which comprise one or more different polyalkylene terephthalates and a graft copolymer. The graft copolymer used is built up from a rubber having an average particle size from 200 to 600, preferably from 300 to 500 nanometers. Again nothing is stated regarding the particle size distribution. These polymer mixtures have a good impact strength at low temperatures.

Polymer mixtures which comprise an aromatic polycarbonate, a polyalkylene terephthalate and a graft copolymer are disclosed, for example, in EP-A-0 064 648 and EP-A-0 131 202. According to EP-A-0 064 648 a polymer which has been obtained by grafting one or more monomers on a butadiene polymerisate having an average particle size of 200 to 600, preferably 300 to 500 nanometers, may be used as a graft copolymer. The polymer mixtures described have a good impact strength under multiaxial load. The particle size distribution is not stated. EP-A-0 131 202 discloses polymer mixtures which may comprise an aromatic polycarbonate, a polyalkylene terephthalate, a graft copolymer and a copolymer. In order to obtain optimum impact strength at low temperatures, according to EP-A-0 131 202 a graft copolymer is used which has been obtained from a rubber having a bimodal particle size distribution: a first part has an average particle size distribution from 50 to 190 nanometers and a second part has an average particle size distribution from 200 to 1,000 nanometers.

The applicants have marketed polymer mixtures which comprise an aromatic polycarbonate, a polyalkylene terephthalate and a graft copolymer having a diene rubber graft base. The graft base used has a bimodal particle size distribution with a first maximum situated at approximately 100 nanometers and a second maximum situated at approximately 280 nanometers (in a graph in which the weight fraction is plotted on the vertical axis and the particle size is plotted on the horizontal axis).

The importance of the particle size distribution for the mechanical properties of graft copolymers has been investigated. According to U.S. Pat. No. 3,600,465, graft copolymers based on a butadiene rubber having an average particle size from 300 to 600 nanometers have a better impact strength with a wider distribution of the particle size.

The invention is based on the discovery that a better combination of properties can be obtained by using a graft copolymer having a graft base having a comparatively small particle size in combination with a narrow particle size distribution in polymer mixtures of the type claimed in the appended claims. Notably, better flow properties and a higher bending modulus are obtained. Moreover, the polymer mixture becomes less sensitive to thermal load in the later use for the formation of articles from the polymer mixture according to the invention. In particular the impact strength at low temperatures is less deteriorated after prolonged thermal load.

A graft copolymer is used in the polymer mixture according to the invention, which graft copolymer is built up from a diene rubber base on which at least one of the following vinyl monomers has been grafted: styrene, acrylonitrile, methyl methacrylate, the diene rubber graft base having a monodisperse particle size distribution having such a narrow particle size distribution that the diameter of more than 50% by weight, preferably of more than 70% by weight, of the particles lies between 200 and 300 nanometers, and the diameter of more than 70% by weight, preferably more than 90% by weight, of the particles, lies between 200 and 400 nanometers.

The polymer mixture according to the invention preferably comprises 65-85% by weight of constituent A, 15-25% by weight of constituent B and 0-10% by weight of constituent C. Per 100 parts by weight of constituent A, A is preferably composed of 10-90 parts by weight, more preferably 10-40 parts by weight of an aromatic polycarbonate (A1), and 90-10 parts by weight, more preferably 60-90 parts by weight, of a polyalkylene terephthalate.

It is generally preferred to incorporate in the polymer mixture according to the invention a transesterification inhibitor. Suitable inhibitors are phosphites, $H_3PO_3$, sodium diphosphate, zinc phosphate, monozinc hydrogene phosphate and monocalcium phosphate.

When the polymer mixture according to the invention comprises a copolymer C, a copolymer is preferably used which has a weight-averaged molecular weight of less than 80,000.

The diene rubber content in the graft copolymer is preferably more than 40% by weight, more preferably more than 60% by weight.

The invention also relates to the articles which can be obtained from the polymer mixture according to the invention by means of conventional molding techniques.

The polymer mixture according to the invention comprises at any rate one or more of the following constituents:
A) an aromatic polycarbonate (A1) or a mixture of (A1) and a polyalkylene terephthalate (A2);
B) a graft copolymer built up from a diene rubber graft base.

It comprises optionally a constituent:
C) a copolymer.
A) aromatic polycarbonate and optionally polyalkylene terephthalate,
A1) aromatic polycarbonate.

Aromatic polycarbonates are materials known per se. They are generally prepared by reacting a dihydric phenol compound with a carbonate precursor, for example, phosgene, a halogen formlate or a carbonate ester. Aromatic polycarbonates are polymers which comprise units of formula I

(I)

wherein $A_1$ is a bivalent aromatic radical derived from the dihydric phenol used in the preparation of the polymer. Mononuclear or polynuclear aromatic compounds which comprise two hydroxy radicals each directly bonded to a carbon atom of an aromatic nucleus may be used as dihydric phenols in the preparation of the aromatic polycarbonates.

The branched polycarbonates known per se as described, for example, in U.S. Pat. No. 4,001,184 are also suitable.

Suitable aromatic polycarbonates are also the so-called polyester carbonates which are obtained by carrying out the polymerisation reaction in the presence of an ester precursor, for example, a difunctional carboxylic acid, for example, terephthalic acid or an ester-forming derivative thereof. These polyester carbonates have ester compounds and carbonate compounds in the polymeric chain. Polyester carbonates are disclosed, for example, in U.S. Pat. No. 3,169,121.

It is also possible to use a mixture of various polycarbonates.

A2) Polyalkylene terephthalate

The invention relates to polymer mixtures which comprise a polyalkylene terephthalate. Polyalkylene terephthalates are polymers having units derived from an alkane- diol and terephthalic acid. The polyalkylene terepnthalate may comprise units derived from one or more alkanediol compounds. The polyalkylene terephthalate may also comprise units derived from one or more further dicarboxylic acids. In addition to the alkanediol, the polyalkylene terephthalate may also comprise units derived from one or more other diol compounds or polyol compounds.

In general, the polyalkylene terephthalate comprises an excess of units derived from an alkanediol with respect to the optionally present units derived from other diol compound or polyol compounds. Examples of suitable alkanediol compounds are ethanediol or butane-1,4-diol. In addition to units derived from terephthalic acid, the polyalkylene terephthalate may also comprise units derived from other dicarboxylic acids or polycarboxylic acids. However, the greater part of the units derived from acids is derived from terephthalic acid.

It is possible to use all kinds of polyalkylene terephthalates. It is preferred to use polyalkylene terephthalates with a relatively low content of terminal acid groups e.g. less than 30 meg/kg.

As a polyalkylene terephthalate is preferably used a polyalkylene terephthalate having more than 70 mol % of units derived from terephthalic acid and butane-1,4-diol. It is also possible to use a mixture of one or more different polyalkylene terephthalates.

B) Graft copolymer built up from a diene rubber graft base.

Graft copolymers built up from a diene rubber graft base are generally known. For this purpose reference may be made, for example, to the patent publications already mentioned hereinbefore. Such polymers are generally built up from a graft base on which at least one monomer has been grafted.

The graft base in the polymer mixtures according to the invention is a diene rubber. At least D one of the following vinyl monomers has been grafted on the graft base: styrene, acrylonitrile, methyl methacrylate.

The diene rubber graft base may be built up entirely or substantially from a diene rubber. A suitable preferably used diene rubber is a butadiene rubber. "Rubber" is to be understood to mean herein a polymer having a glass transition temperature of not higher than 0° Celcius, preferably not higher than minus 20° Celcius.

The graft copolymers are usually prepared by emulsion polymerisation of the monomers to be grafted in the presence of a Latex of the diene rubber graft base. The particle size of the graft base is not or hardly influenced by the graft reaction. The diene rubber content in the graft copolymer is preferably more than 40% by weight, more preferably more than 60% by weight.

It is of essential importance for graft copolymers having a given particle size distribution as described hereinbefore and as claimed in the appended claims to be used in the polymer mixtures according to the invention.

The particle size distribution referred to hereinbefore has been determined by means of capillary hydrodynamic fractioning (CHDF) using a CDHF-1100 particle size analysing system of Matec Applied Sciences, Hopkinton, Mass., U.S.A. This method is elaborately described by Dos Ramos, J. G.; Silebi, C. A. Journal of Colloid and Interface Science, vol. 135, No. 1, pp. 165-177.

Such latices are commercially available. Their mode of preparation is generally known.

As already indicated hereinbefore, the polymer mixture may comprise a copolymer (C).

C) Copolymer

The polymer mixture according to the invention may comprise a copolymer obtained by copolymerisation of one or more of the following monomers: styrene, alpha-methyl styrene, methyl methacrylate, with one or more of the following monomers: acrylonitrile, methacrylonitrile, methyl methacrylate.

The copolymer may have been prepared separately and may then have been added to the polymer mixture. It is also possible for the copolymer to be formed in the graft reaction for the preparation of the graft copolymer: in fact, it is substantially excluded in practice to graft the monomers to be grafted completely on the graft base.

The copolymer preferably has a weight-averaged molecular weight of less than 80,000, more preferably less than 70,000.

The polymer mixture according to the invention may further comprise conventionally used additives for polymers or for polymer mixtures, for example, fillers, reinforcing fibres, stabilisers, flame-retardants, dyes and pigments.

Suitable additives are polyethylenes, polyethylene glycols and polydimethylsiloxanes.

The polymer mixture according to the invention may be prepared according to the conventionally used methods of preparing polymer mixtures.

All the patent publications mentioned hereinbefore are considered to be incorporated in the present patent application by reference.

Comparative Examples A and B; Example I According to the Invention.

Three different graft copolymers were used in the examples hereinafter:

ASB-1 a graft copolymer obtained by grafting 26 parts by weight of styrene and 8.7 parts by weight of acrylonitrile on 65 parts by weight of a polybutadiene latex. The content of non-grafted styrene-acrylonitrile copolymer (SAN) obtained in the grafting reaction of the isolated ABS was approximately 6% by weight. The weight ratio styrene to acrylonitrile in the SAN was approximately 2.7. The weight-averaged molecular weight of-the SAN was approximately 62,000. The particle size of the butadiene rubber is recorded in the appended Figure and in the example hereinafter. The gel content was 87% by weight.

ABS-2 a graft copolymer obtained by grafting 26.5 parts by weight of styrene and 8.3 parts by weight of acrylonitrile on 65.2 parts by weight of a polybutadiene latex. The content of non-grafted styrene-acrylonitrile copolymer (SAN) obtained in the grafting reaction of the isolated ABS was approximately 6.3% by weight. The weight ratio styrene to acrylonitrile in the SAN was approximately 2.7. The weight-averaged molecular weight of the SAN was approximately 78,000. The particle size of the butadiene rubber is indicated in the appended Figure and in the table hereinafter. The gel content was 95% by weight.

ABS-3 a graft copolymer obtained by grafting 25.4 parts by weight of styrene and 7.1 parts by weight of acrylonitrile on 67.5 parts by weight of a polybutadiene latex. The content of non-grafted styrene-acrylonitrile copolymer (SAN) obtained in the grafting reaction of the isolated ABS was approximately 8% by weight. The weight ratio styrene to acrylonitrile in the SAN was approximately 2.8. The weight-averaged molecular weight of the SAN was approximately 108,000. The particle size of the butadiene rubber is recorded in the appended Figure and in the table hereinafter. The gel content was 95% by weight.

The particle size in nanometers (nm) is recorded in table A hereinafter.

TABLE A

| Range (nm) | ABS-1 200–630 | ABS-2 100–620 | ABS-3 20–740 |
|---|---|---|---|
| Size (nm) | Weight fraction | | |
| 0–100 | 0 | 0 | 8.69 |
| 100–200 | 0.01 | 27.16 | 20.29 |
| 200–300 | 77.30 | 42.73 | 24.63 |
| 300–400 | 20.40 | 22.71 | 21.28 |
| 400–500 | 2.05 | 6.44 | 17.05 |
| 500–600 | 0.02 | 0.75 | 5.75 |
| >600 | 0.22 | 0.21 | 2.31 |

These results have been obtained by means of a CHDF-1100 particle size analyzer of Matec Applied Sciences.

The particle size distribution of a few graft copolymers as used in the examples is recorded in FIG. 1. The particle size (in nanometers) is plotted on the horizontal axis; the weight fraction (in %) is plotted on the vertical axis.

For the preparation of polymer mixtures, the following polymers were used in addition:

PC: an aromatic polycarbonate derived from bisphenol A and phosgene, having an intrinsic viscosity of 58 ml/g measured in methylene chloride at 25° C.

PBT: a polybutylene terephthalate having an intrinsic viscosity of 1.02 dl/g measured in a 60/40 mixture of phenol and tetrachloroethane at 25° C.

The constituents mentioned in Table B hereinafter were compounded in the indicated quantities in an extruder (average adjusted temperature approximately 260° C.). The resulting extrudate was then pelletised. The melt viscosity index (MVI) at 250° C., 4 minutes, of the pellets was determined (according to ASTM D 1238).

Test rods were injection-moulded from the pellets to determine the impact strength according to Izod (ASTM D 256) and to determine the flex modulus; ASTM D-790). The rods were injection-moulded under normal conditions: i.e. at an average adjusted temperature of the barrel (=cylinder) of 255° C. and with a residence time in the barrel of 2 minutes.

Moreover, a second series of test rods were injection-moulded to determine the impact strength according to Izod. This time under extra heavy conditions during the injection-moulding: 286° C. with a residence time of 10 minutes.

Besides, the temperature was always determined at which a transition from brittle to ductile behaviour occurs in the Izod impact strength test (transition temperature).

The results obtained are also recorded in Table B hereinafter.

TABLE B

| Example | A* | B* | I** |
|---|---|---|---|
| Composition (parts by weight) | | | |
| •PC | 20 | 20 | 20 |

TABLE B-continued

| Example | A* | B* | I** |
|---|---|---|---|
| •PBT | 60 | 60 | 60 |
| •ABS-1 | — | — | 18 |
| •ABS-2 | — | 17.5 | — |
| •ABS-3 | 17.5 | — | — |
| Properties | | | |
| •Flex modulus (MPa) | 1750 | 1900 | 1900 |
| •Melt viscosity index (cc/10') | 10 | 14 | 18 |
| •Impact strength 1) (J/m) | | | |
| at minus 30° C. | 670 | 620 | 680 |
| minus 35° C. | 590 | 600 | 660 |
| minus 40° C. | 240 | 230 | 215 |
| •Transition temperature (°C.) | −36 | −35 | −37 |
| •Impact strength 2) (J/m) | | | |
| •room temperature | 540 | 510 | |
| •0° C. | 165 | 285 | 645 |
| •minus 10° C. | | | 350 |
| •minus 15° C. | | | 155 |
| •Transition temperature (°C.) | plus 5 | 0 | minus 10 |

1) after injection moulding under normal conditions
2) after injection moulding under severe conditions
*for comparison
**according to the invention It may be seen from the above results that the polymer mixture according to the invention has a better flow than the polymer mixtures A and B and a better flex modulus than polymer mixture A.

The impact strength and the transition temperature of all three polymer mixtures after injection moulding under normal conditions is substantially equal.

After injection moulding under "severe" conditions, as they may sometimes occur in practice, the polymer mixture according to the invention (Example I) significantly has a more favourable (i.e. higher) transition temperature.

We claim:

1. A polymer mixture comprising
    A) 55–90% by weight of an aromatic polycarbonate (A1) or a mixture oil an aromatic polycarbonate (A1) and a polyalkylene terephthalate (A2)
    B) 10–30% by weight of a graft copolymer built up from a diene rubber graft base on which at least one of the following vinyl monomers has been grafted: styrene, acrylonitrile, methyl methacrylate;
    C) 0–15% by weight of a copolymer of styrene, alpha-methyl styrene, methyl methacrylate or mixtures thereof and acrylonitrile, methacrylonitrile, methyl methacrylate or mixtures thereof, the weight percentages being calculated with respect to the sum of the constituents A, B and C, the diene rubber graft base having a mono disperse particle size distribution having such a narrow particle size distribution that the diameter of more than 50% by weight of the particles lies between 200 and 300 nanometers and the diameter of more than 70% by weight of the particles lies between 200 and 400 nanometers.

2. A polymer mixture as claimed in claim 1, in which the particle size distribution is such that the diameter of more than 70% by weight of the particles lies between 200 and 300 nanometers and the diameter of more than 90% by weight of the particles lies between 200 and 400 nanometers.

3. A polymer mixture as claimed in claim 1, wherein the polyalkylene terephthalate (A2) is a polybutylene terephthalate.

4. A polymer mixture as claimed in claim 1, wherein the polymer mixture comprises 65–85% by weight of constituent A, 15–25% by weight of constituent B and 0–10% by weight of constituent C.

5. A polymer mixture as claimed in claim 1, wherein per 100 parts by weight constituent A comprises 10–90 parts by weight of an aromatic polycarbonate (A1) and 90–10 parts by weight of a polyalkylene terephthalate.

6. A polymer mixture as claimed in claim 1, wherein per 100 parts by weight constituent A comprises 10–40 parts by weight of an aromatic polycarbonate and 60–90 parts by weight of a polyalkylene terephthalate.

7. A polymer mixture as claimed in claim 1, wherein the weight-averaged molecular weight of constituent C is less than 80,000.

8. A polymer mixture as claimed in claim 1, wherein the diene rubber content of the graft copolymer is more than 40% by weight.

9. A polymer mixture as claimed in claim 1, wherein the polymer mixture comprises further additives.

10. Articles formed from the polymer mixture as claimed in claim 1.

* * * * *